Patented Aug. 16, 1932

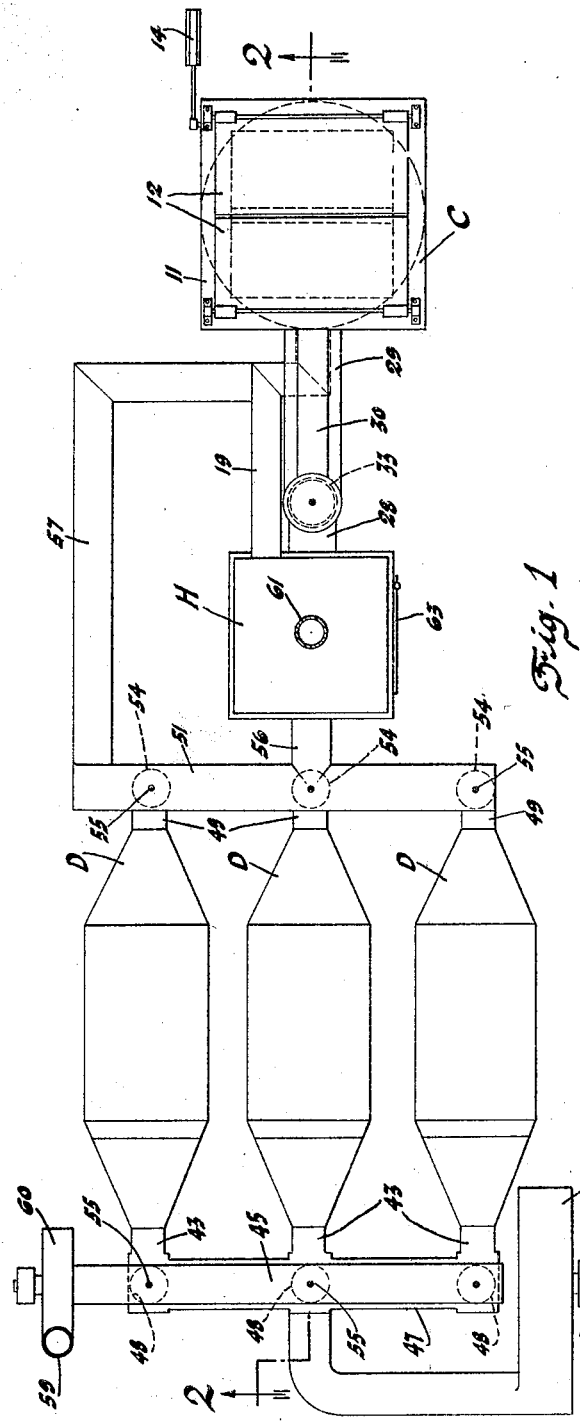

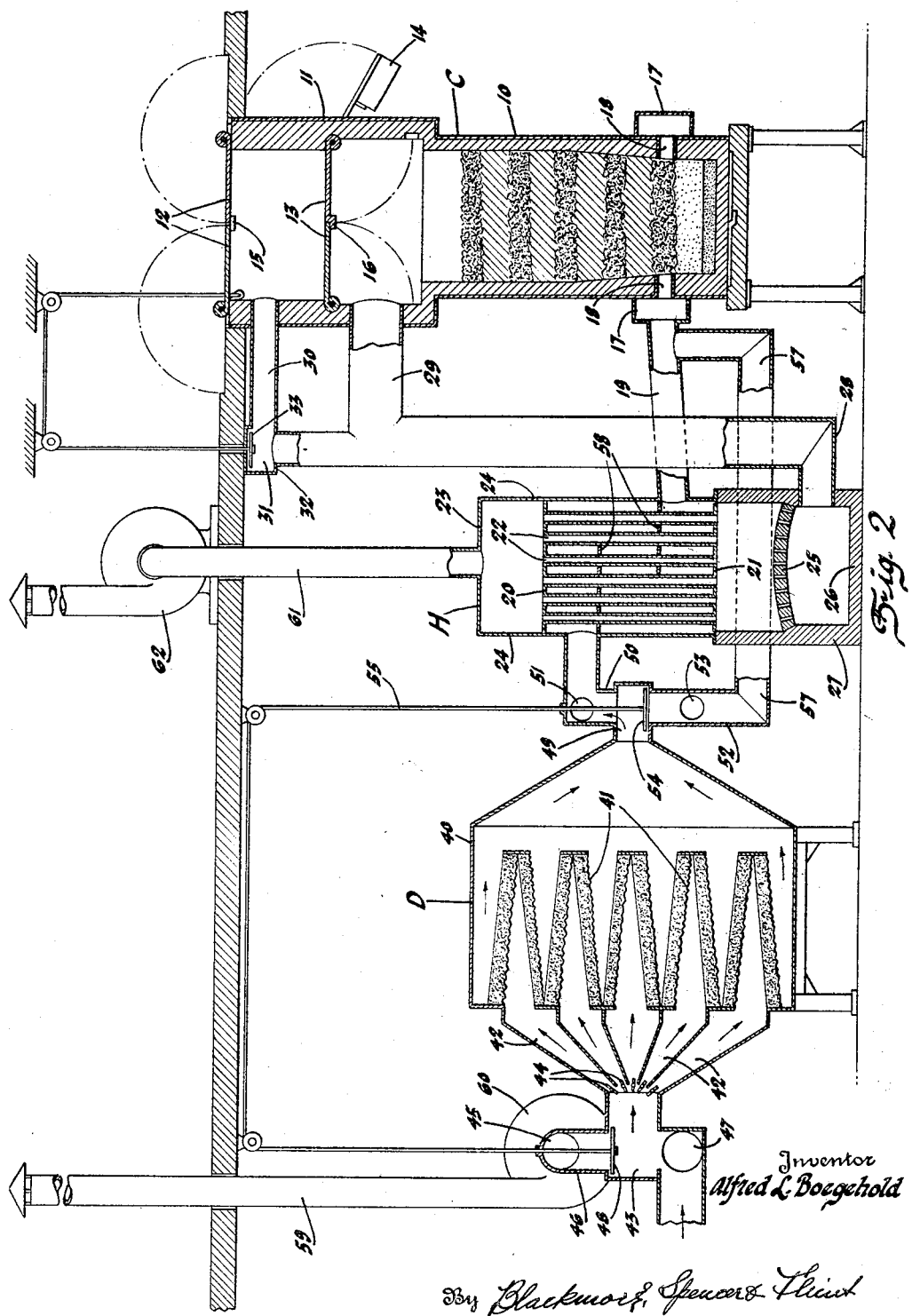

1,872,569

UNITED STATES PATENT OFFICE

ALFRED L. BOEGEHOLD, OF DETROIT, MICHIGAN, ASSIGNOR TO GENERAL MOTORS RESEARCH CORPORATION, OF DETROIT, MICHIGAN, A CORPORATION OF DELAWARE

OPERATING A CUPOLA FURNACE

Original application filed February 24, 1930, Serial No. 430,821. Divided and this application filed December 16, 1931. Serial No. 581,292.

This invention relates to the operation of cupola furnaces designed for the economical production of cast iron; and more particularly to the operation of cupolas adapted to enclose a reducing atmosphere in the melting zone.

Among the objects of the invention are to operate a cupola with a reducing atmosphere in and over the charge containing portions; to utilize substantially all of the gases rising from the melting zone and charge containing portion to restore heat to the charges; to so charge the cupola that no gases may be lost during the charging operation; to heat the air to be forced through the tuyeres by burning all the combustible gas produced in the cupola and transferring the heat produced to the air blast; to dry the air to be forced through the tuyeres; to reactivate hygroscopic material used to dry said air by forcing pure hot air drawn from the hot air on its way to the cupola into contact with said material; and otherwise to improve methods and means for producing cast iron.

In the accompanying drawings which disclose somewhat diagrammatically an apparatus adapted to practice the invention, Fig. 1 is a plan view of a cupola with associated blast drier and heater.

Fig. 2 is a sectional elevation of the apparatus on the line 2—2 of Fig. 1.

In the drawings C represents a cupola shown as charged with alternate layers of coke, and iron or steel, to be melted for the production of cast iron. H indicates a heater for heating the air blast used for supplying oxygen to the cupola for combustion purposes. D indicates a drier for drying the air previous to its admission into the heater and to the cupola.

That part of the cupola represented by numeral 10, which contains the charges of coke and iron or steel, is circular in section and lined with fire-resistant material as is customary. The upper charge admitting portion of the cupola 11 is preferably square in section as illustrated. Through two vertically spaced closures in this square portion the charges of coke and metal are introduced into the cupola. Inasmuch as it is desired to utilize in the charge irregular steel scrap such as flashings and the like the closures thru which the charges are introduced are adapted to open so as to leave charging openings of the full cross-sectional area of the cupola. At least the lower closure consists of one or two doors hinged to the wall of the cupola to open downward so as to leave a free passageway affording no obstructions with which irregular scrap may become entangled.

One closure is at the top of the cupola, and one farther down within the squared portion, each illustrated as composed of two hinged doors. The doors 12 of the upper closure may be opened for the reception of a charge by swinging them upward and outward by means of any suitable mechanism, not illustrated. The charge may then be inserted thru the top of the cupola onto the lower closure consisting of the hinged doors 13, which may be suitably counter-weighted as at 14, to assist in sustaining the charge and controlled by suitable mechanism (not shown). The upper doors 12 may then be closed and the doors 13 swung downward to drop the charge into the circular charge containing portion of the cupola. Where two doors 12 are used one of them has a lip 15 secured to it, said lip projecting under the edge of the mating door when in closed position. In case two doors 13 are used one of them has a similar lip 16 adapted to engage with the edge of the door which mates with it when in closed position as shown. Spaces are formed in the opposite inner sides of the cupola to receive the doors 13 when open.

In order to direct a blast of air for combustion purposes into the coke at the bottom of the cupola, an annular wind box, or encircling manifold 17, surrounds the lower portion of the cupola and communicates with the interior thereof thru a plurality of tuyeres 18. A pipe 19 connects the box 17 with the heater H, which contains a heat interchanger or transfer device of the surface type comprising upper and lower headers 20 and 21 respectively, into which a plurality of vertical tubes 22 are connected at their ends.

The upper header is spaced from the top wall 23 of the casing 24, and the lower header 21 is spaced from a perforated transverse wall 25 about midway between the header 21 and the floor 26 of a gas burner or furnace structure 27 which may have a door 63 or other controlled opening. The space below the perforated wall 25 receives combustible gases from the cupola C, thru the stand pipe 28, which extends upward between the heater and the cupola and is provided with two branches 29 and 30. The branch 29 enters the square portion of the cupola beneath the doors 13 and above the charges and the branch 30 enters said portion of the cupola between the doors 12 and 13. At the junction of the branch 30 with the pipe 28, there is a slight enlargement 31 which provides a shoulder 32 in line with the under side of branch 30. The shoulders thus formed constitute a seat for a valve 33, which, as shown, is suitably connected with one of the doors, 12, so that when said door is opened by moving it upward the valve 33 is permitted to descend and engage the valve seat, thereby cutting off communication between the pipe 28 and the open cupola or external air thru the branch 30.

Drier D comprises a casing 40 in which are disposed a number of pans 41 arranged one above the other in zigzag form, as shown. These pans 41 are designed to receive a hygroscopic material such as calcium chloride or silica-gel, preferably the latter. There are a plurality of driers D preferably not less than three, as shown in Fig. 1, for a purpose to be made known presently. Each drier D is connected by several passages 42 with an air inlet conduit 43. The passages 42 are shown as flaring or gradually enlarging in section from their connection with the pipe 43 toward the drier; and in the orifices at the points of connection with pipe 43 are arranged a number of baffles 44 for the purpose of well distributing the air flowing thru the pipe 43 to the several passages 42. The pipe 43 communicates with a moist air header pipe 45 extending crosswise of the several driers, by means of upright short conduits 46. A lower normal atmospheric air header pipe 47, which may be fed with air by a blower 64, is also connected with each of said pipes 43. Each of the openings between pipes 43 and header 45, and between said pipes and header 47, are adapted to be closed, alternately, by a valve 48. When the valve 48 of any drier D is in the upper position as shown in Fig. 2 the passage from pipe 43 through pipe 46 to header 45 is closed while the passage from pipe 43 to header 47 is opened. When the valve 48 is lowered over the communication between the pipe 43 and the header 47, the latter is closed off from communication with said pipe 43, and the passage to header pipe 45 is opened.

The outlet for air from a drier on its way to the heater is indicated at 49. There is an outlet 49 for each drier and each of said outlets communicates by means of a short section of piping 50 with a header pipe 51 disposed above the outlet, and by means of a pipe section 52 with a header pipe 53 disposed below said outlet 49. In the outlet 49 there is a valve 54, which, when it is in lowered position, as illustrated in Fig. 2, closes the communication between said pipe 49 and the pipe 52 and header 53, but when in its upper position closes the communication between pipe 49, pipe 50 and header 51 leaving the lower communication open.

The valve 48 at the inlet side of each drier and the valve 54 at the outlet side of the same drier are suitably connected, as by the flexible connector 55, in such relation that when the valve 48 is on its upper seat, as illustrated, the valve 54 is on its lower seat.

The header pipe 51 is connected by a single conduit 56 with the blast heater H, as shown in Fig. 2, while the lower header 53 is connected by the single pipe 57 with the pipe 19 which leads directly from the blast heater to the wind box 17.

Within the heater H, baffles 58 are disposed in between the tubes 22, so that dry air entering the heater thru the pipe 56 will have to take a somewhat tortuous passage around the baffles before passing from the heater into the pipe 19 on its way to the cupola.

Rising from the moist air header pipe 45, before referred to, at one end, is a stack 59 adapted to discharge moist air from an exhaust blower 60.

Rising from the heater H is a stack 61 in which is disposed an exhaust blower 62 adapted to discharge waste gases of combustion from the heater H.

In operation, successive charges of coke and metal are introduced into the cupola as needed. To introduce a charge of coke and metal the doors 12 are opened and the valve 33 closed upon its lower seat thus shutting off communication between stand pipe 28 and the outer atmosphere. The charge is deposited upon the doors 13. When a sufficient quantity has been deposited on doors 13, the doors 12 are closed thus lifting valve 33, thereby establishing communication between stand pipe 28 and the space between the two closures in the cupola thru pipe 30. The doors 13 are then opened and the charge dropped into the cupola. Successive charges are introduced into the cupola in this manner.

Assuming the lower layer of coke to have been ignited:

With the apparatus adjusted as shown in Fig. 2, air enters the lower header pipe 47 from a blower 64 (shown in Fig. 1) as indicated by the arrow at the left. It passes up into the pipe 43 and thence thru the drier D. From the drier D it passes thru the pipe 49 and into the header 51 and thence into the heater H. From the heater H it passes thru the pipe 19 into the manifold or wind box 17 and thru the tuyères into the cupola where it enters into the lower coke bed. The heater H, when the coke is burning, receives the unburned gases which rise thru the charges to the top of the cupola thru stand pipe 28 into the furnace 27 where it is ignited. The gas and products of combustion from the gas burning in the furnace 27 pass up thru the holes in the floor 25 and thru the tubes 22 and, after having given up a proportion of their heat to the air surrounding tubes 22 in the heater, the resulting burned gases are drawn thru the stack 61 by the exhaust blower 62 and are driven out of the top of the stack.

A plurality of driers is used so that when the hygroscopic drying material in one of them has become saturated with moisture this material may be reactivated by absorbing the moisture in a current of hot air. When it has been decided to reactivate one of the driers the valves 54 and 48 appertaining to that particular drier are reversed in position with respect to that shown in Fig. 2. With the valves in this new position some of the pure dry hot air flowing from the heater toward the cupola is shunted off thru the pipe 57, conducted to the header 53 and thence to the drier thru the open port pertaining to that particular drier. This pure dry hot air passes over the pans containing the hygroscopic material and now laden with moisture picked up from the hygroscopic material flows into the pipe 46 and then upward into the header pipe 45, which is subject to the draught produced by the exhaust blower 60, and thence it is driven out thru the stack 59. When the material in this particular drier has been reactivated it is again put into service to dry incoming air as previously described. Each of the several driers may be reversed for reactivating the hygroscopic materials in the same manner and again put into service without interfering with the operation of the others.

In the apparatus disclosed all of the gases generated in the cupola are drawn off and used to heat the air blast. Even when charges are being introduced no gases escape; when the lower doors 13 are closed they escape thru the cross pipe 29, and when a charge is being dropped thru the doors 13 they escape also thru the pipe 30, into the furnace 27, where the combustible ingredients are burned. If there is insufficient air in the gases proceeding from the cupola to support combustion additional air may be admitted thru the door of furnace 27.

In operating this cupola the quantities of fuel and air, introduced are in such proportions as to provide a reducing atmosphere in the melting zones. It is not economic to have a reducing atmosphere in the ordinary cupola because of the large heat losses resulting from losses of carbon monoxide. But in the melting of iron it is desirable to have a reducing atmosphere, both on account of the improved quality of the metal produced and because it is possible to obtain a greater carburizing action permitting the use of large quantities of steel scrap and consequently lowering the cost of the cast iron produced.

With the apparatus disclosed herein it is possible to obtain a satisfactory reducing atmosphere without substantial losses of carbon monoxide because the heat available from its combustion is transferred to the air blast and so restored to the cupola.

In the ordinary cupola the gases in the melting zone and charge containing portion analyze approximately 14% carbon dioxide and 12% carbon monoxide. Because the quantity of carbon monoxide is less than that of carbon dioxide, the carburizing effect of the gases on the metal is slight, most of the carbon collected by the iron being absorbed when the iron is molten from the incandescent coke in contact with it. By burning the fuel so that the gases in the melting zone are composed of about 25% of carbon monoxide and 12% of carbon dioxide, the carbon monoxide becomes a powerful carburizer, and increases the amount of carbon that can be introduced into the iron metal during the melting. As a result the iron drawn from the cupola will contain the quantity of carbon to make good cast iron even though a large proportion of steel scrap be used in the charge.

This application is a division of application S. N. 430,821.

I claim:

1. A process of operating a cupola containing charges composed of alternate layers of coke and iron metal, which consists of introducing a quantity of air into the lower portion of the cupola at the bottom of the charge such that the gases generated by combustion of the coke which permeates the charges contain a larger quantity of carbon monoxide than of carbon dioxide, withdrawing gas from the space in the cupola above the charges, burning said gas, and transferring the heat generated thereby to the air to be introduced into the lower portion of the cupola.

2. A process of operating a cupola containing charges composed of alternate layers of coke and iron metal, which consists of introducing a quantity of air into the lower portion of the cupola, continuously withdrawing from the space in the cupola above the charges all of the gas generated by combustion of the coke, burning the combustible ingredients of said gas, transferring the heat generated by the burning gas to a moving body of air, and introducing the so heated air into the lower portion of the cupola.

3. The process of operating a cupola as defined in claim 2 in combination with the following steps: drying the moving body of air to be heated by passing it over a mass of hygroscopic material, and subsequently reactivating the hygroscopic material by directing over it air dried by contact with another mass of hygroscopic material and heated by said burning gas, said air for reactivating the hygroscopic material being withdrawn from the body of hot air being introduced into the lower portion of the cupola.

In testimony whereof I affix my signature.
ALFRED L. BOEGEHOLD.